United States Patent
Saha

(10) Patent No.: US 12,448,527 B2
(45) Date of Patent: Oct. 21, 2025

(54) MICROBICIDAL COATINGS WITH COLOR CHANGE

(71) Applicant: B/E Aerospace, Inc., Winston Salem, NC (US)

(72) Inventor: Bipul Saha, Kolkata (IN)

(73) Assignee: B/E Aerospace, Winston Salem, NC (US)

( * ) Notice: Subject to any disclaimer, the term of this patent is extended or adjusted under 35 U.S.C. 154(b) by 356 days.

(21) Appl. No.: 17/689,909

(22) Filed: Mar. 8, 2022

(65) Prior Publication Data
US 2022/0289986 A1     Sep. 15, 2022

(30) Foreign Application Priority Data
Mar. 9, 2021 (IN) .............................. 202141009814

(51) Int. Cl.
*C09D 5/14*   (2006.01)
*C09D 5/29*   (2006.01)
*C09D 7/61*   (2018.01)

(52) U.S. Cl.
CPC ................. *C09D 5/14* (2013.01); *C09D 5/29* (2013.01); *C09D 7/61* (2018.01)

(58) Field of Classification Search
CPC ........ A61L 2/28; A61L 2/238; A61L 2202/14; A61L 9/12; G01N 21/29; B44F 1/10; E05B 1/0015; E05B 1/0061; E05B 1/0069; G04F 13/02
USPC ............................ 428/29; 427/145; 16/110.1
See application file for complete search history.

(56) References Cited

U.S. PATENT DOCUMENTS

| | | | |
|---|---|---|---|
| 2006/0230576 A1 | 10/2006 | Meine | |
| 2010/0190004 A1* | 7/2010 | Gibbins | A61F 13/02 |
| | | | 428/343 |
| 2010/0323130 A1 | 12/2010 | Cockman et al. | |
| 2020/0190847 A1 | 6/2020 | Roberts et al. | |
| 2021/0316773 A1* | 10/2021 | Hunter | B62B 5/069 |
| 2021/0404970 A1* | 12/2021 | Poteet | G01N 21/643 |

FOREIGN PATENT DOCUMENTS

| | | | | |
|---|---|---|---|---|
| CA | 2754918 A1 | * | 9/2010 | ............. B22F 1/0553 |
| CA | 3179629 A1 | * | 11/2020 | ............. B32B 21/08 |
| CN | 110511485 A | * | 11/2019 | ............. C08L 23/12 |

(Continued)

OTHER PUBLICATIONS

Kharade et al., Enhanced electrochromic coloration in Ag nanoparticle decorate WO3 thin films, 2013, Electrochimica Acta, 102, 358-368 (Year: 2013).*

(Continued)

*Primary Examiner* — Jun Li
*Assistant Examiner* — Jialan Zhang
(74) *Attorney, Agent, or Firm* — SNELL & WILMER L.L.P.

(57) ABSTRACT

A method comprises receiving touch contact from a user on a surface and disinfecting the surface after the user breaks contact with the surface. The method includes changing color of the surface after the user breaks contact with the surface from a first color to a second color as a visible indicator that the surface has been recently touched. Further, the method includes changing the color of the surface from the second color back to the first color after disinfecting the surface as an indicator that the surface is safe to touch.

13 Claims, 2 Drawing Sheets

(56) References Cited

FOREIGN PATENT DOCUMENTS

| | | | | |
|---|---|---|---|---|
| FR | 2891844 A1 | * | 4/2007 | .............. A47J 36/02 |
| JP | 2012229444 A | * | 11/2012 | .............. A43B 13/04 |
| WO | WO-2007093823 A1 | * | 8/2007 | .............. B32B 17/10 |
| WO | 2007137306 A2 | | 11/2007 | |
| WO | WO-2017018623 A1 | * | 2/2017 | .............. A47J 36/02 |

OTHER PUBLICATIONS

Hong et al., Facile Fabrication of multifunctional fabrics: use of copper and silver nanoparticles for antibacterial, superhydrophobic, conductive fabrics, 2018, RSC Advances, 8, 41782-41794 (Year: 2018).*

Godoy-Gallardo et al., Antibacterial approaches in tissue engineering using metal ions and nanoparticles: From mechanisms to applications, 2021, Bioactive Materials, 6, 4470-4490 (Year: 2021).*

Chatterjee et al., Mechanism of antibacterial activity of copper nanoparticles, 2014, Nanotechnology, 25, 135101 (Year: 2014).*

Al-Kuhaili et al., Transparent heat mirrors based on tungsten oxide-silver multilayer structures, 2009, Solar Energy, 83, 1571-1577 (Year: 2009).*

Rivero et al., An antibacterial coating based on a polymer/sol-gel hybrid matrix loaded with silver nanoparticles, 2011, Nanoscale Research Letters, 6:305, p. 1-7 (Year: 2011).*

Machine translation of FR-2891844-A1 originally published Apr. 13, 2007 to Demourgues et al. (Year: 2007).*

López de Dicastillo, et al. 'Antimicrobial Effect of Titanium Dioxide Nanoparticles'. Antimicrobial Resistance—A One Health Perspective, IntechOpen, Mar. 3, 2021, abstract (Year: 2021).*

Machine translation of CN-110511485-A originally published Nov. 29, 2019 to Zhang et al. (Year: 2019).*

Machine translation of JP-2012229444-A originally published Nov. 22, 2012 to Hoya et al. (Year: 2012).*

News Medical "Copper surfaces can inactivate SARS-CoV-2in as little as one minute, study finds", https://web.archive.org/web/20210105174437/https://www.news-medical.net/news/20210105/Copper-surfaces-can-inactivate-SARS-COV-2-in-as-little-as-one-minute-study-finds.aspx, Jan. 5, 2021 (Year: 2021).*

Kelly et al., "Evaluation of Solid or Liquid Phase Conducting Polymers Within a Flexible Textile Electrochromic Device" (Kelly), Journal of Display Technology, vol. 9, No. 8, Aug. 2013 (Year: 2013).*

\* cited by examiner

MICROBICIDAL COATINGS WITH COLOR CHANGE

CROSS-REFERENCE TO RELATED APPLICATIONS

This application claims priority to and the benefit of Indian Provisional Patent Application No. 202141009814, filed Mar. 9, 2021, the entire content of which is incorporated herein by reference.

BACKGROUND

1. Field

The present disclosure relates generally to reducing the spread of infectious diseases, and in particular to surface treatments for reducing the spread of infectious diseases such as in aircraft interiors and airports.

2. Description of Related Art

Due to historical pandemic situations and in particular due to the COVID-19 pandemic, a considerable cohort of passengers are afraid of air travelling. At least some of this fear includes the fear of becoming infected by contact with primary and secondary sources of infection in the airport and aircraft interior. Although there are some primary infection control practices in place (such as wearing masks and social distancing) and detection mechanism are used to identify infected passengers using different types of scanning (e.g. for temperature, oxygen level) at the entrances, these techniques are still not proven too guarantee certainty of eliminating spread of contagions. There will be always some asymptomatic passengers that can clear all basic infection checks at the entrance and enter the airport and/or aircraft. Such an asymptomatic individual can touch all the vulnerable surfaces which can potentially be a secondary infection source for many other passengers. These surfaces can include trolley handles, door knobs, chair handles, flush handles, any buttons (such as in ATMs, lifts, vending machines, check-in Kiosks, flush buttons, and the like) or it can be any platform in front of a check-in desk, security check baskets, boarding desks, or the like. These dangerous microorganisms can live on surfaces from 1 to 24 hours or even more based on type of surfaces. During that time these surfaces can become a considerable and constant source of germs in the airport or aircraft interior.

The conventional techniques have been considered satisfactory for their intended purpose. However, there is an ever present need for improved systems and methods for self-disinfecting surfaces with indication. This disclosure provides a solution for this need.

SUMMARY

A method comprises receiving touch contact from a user on a surface and disinfecting the surface after the user breaks contact with the surface. The method includes changing color of the surface after the user breaks contact with the surface from a first color to a second color as a visible indicator that the surface has been recently touched. Further, the method includes changing the color of the surface from the second color back to the first color after disinfecting the surface as an indicator that the surface is safe to touch. Disinfecting the surface and changing the color can include the surface self-cleaning and self-changing color.

Disinfecting the surface can include disinfecting the surface in 30 seconds or less, and changing the color of the surface from the second color back to the first color after disinfecting can take 30 seconds or more. The surface can include at least one anti-microbial and/or biostatic material. The surface can include $CuO_2$ and/or a silver copper ion material. The surface can include at least one of a tribochromatic material, an electrochromic material, and/or a halochromatic material.

A coating can comprise a first material with at least one of anti-microbial and/or biostatic properties and a second material with at least one of tribochromatic, electrochromic, and/or halochromatic properties. The first material can include at least one of $CuO_2$ and/or a silver copper ion material. The second material can be in a first layer and the second material can be in a second layer overlying the first layer. The second layer can include a transparent matrix for allowing visibility of color of the first layer through the second layer. The first material can be distributed as particles embedded in the transparent matrix.

The first material and the second material can both interspersed within a single layer. The first material and the second material can form a regular, repeating pattern in the single layer. The first material and the second material can form an irregular, non-repeating pattern in the single layer.

An apparatus can include a substrate and a coating on an external surface of the substrate. The coating can include a first material with at least one of anti-microbial and/or biostatic properties and a second material with at least one of tribochromatic, electrochromic, and/or halochromatic properties. The substrate includes at least one of a trolley handle, a door knob, a chair handle, a flush handle, a button, a platform in-front of a check-in desk, a security check basket, a boarding desk, and/or a toilet flush mechanisms.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
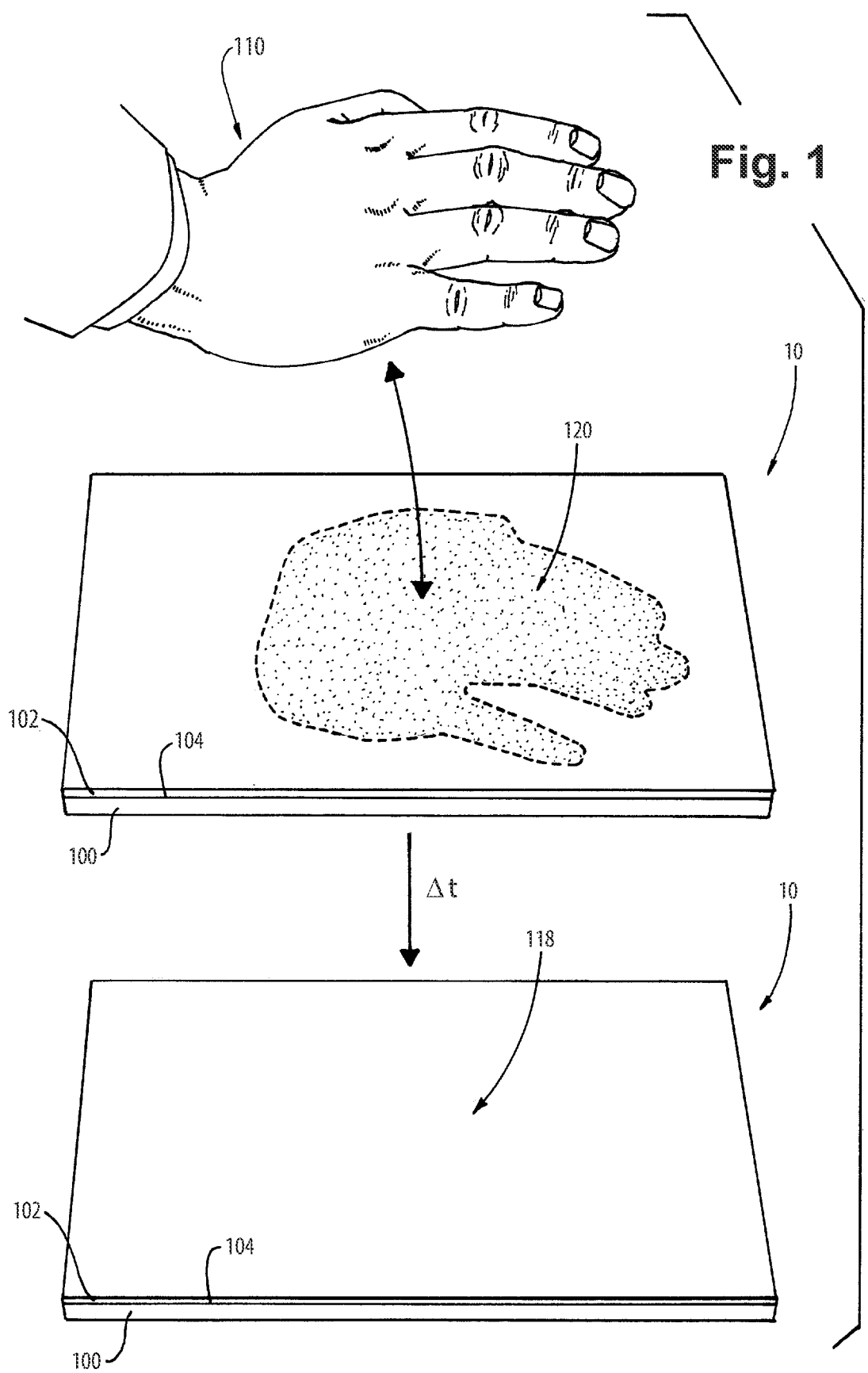
FIG. 1 is a schematic perspective view of an embodiment of a system constructed in accordance with the present disclosure, showing a coating changing from a second color to a first color.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to self-disinfect surfaces and provide indication when the surface is disinfected versus when it is not.

Shown in FIG. 1, an apparatus 10 can include a substrate 100 and a coating 102 on an external surface 104 of the substrate 100. The substrate 100 can include at least one of a trolley handle, a door knob, a chair handle, a flush handle, a button, a platform in-front of a check-in desk, a security check basket, a boarding desk, or the like. It is contemplated that the substrate 100 can include any high traffic touch points throughout an area, such as touch points inside aircraft, airports, hospitals, office spaces, arenas, and the like.

The coating 102 can include a first material 106 and a second material 108 that can be different from the first material 106. For example, the first material 106 can include at least one of $CuO_2$ and/or a silver copper ion material. When copper is rightly oxidized, it can display superior antimicrobial properties. Similarly, copper and silver ionization with the proper level oxidation can also exhibit enhanced antimicrobial properties, for both preventing growth and quickly killing bacteria and viruses that land upon the surface having coating 102. It is possible for other copper alloys to be used in a similar manner, therefore it is contemplated that the first material 106 can include any suitable material having anti-microbial and/or biostatic properties.

The second material 108, can have one of tribochromatic, electrochromic, and/or halochromatic properties. For a tribochromatic material, when a surface (e.g. surface 104) is touched, frictional forces will be created between the surface 104 and the object (e.g. a hand 110) touching the surface 104, generating heat and changing the color of the material 108 at the point of touch. For an electrochromic material, static charges from the hand 110 will create voltage on the surface 104, changing the color of the material 108 at the point of touch. For halochromic material, human skin generally has a pH level of 3-5, while antimicrobial or biostatic materials (such as material 106) will have a pH much higher or lower than 3, so the change in pH level on the surface 104 will change the color of the material 108. It should be appreciated by those skilled in the art that tribochromatic, electrochromic, and/or halochromatic properties are exemplary and do not represent an exhaustive list of possible materials for the second material 108. It is contemplated that any material having suitable color changing properties can be employed for the second material 108 without deviating from the scope of this disclosure.

Figure 2:
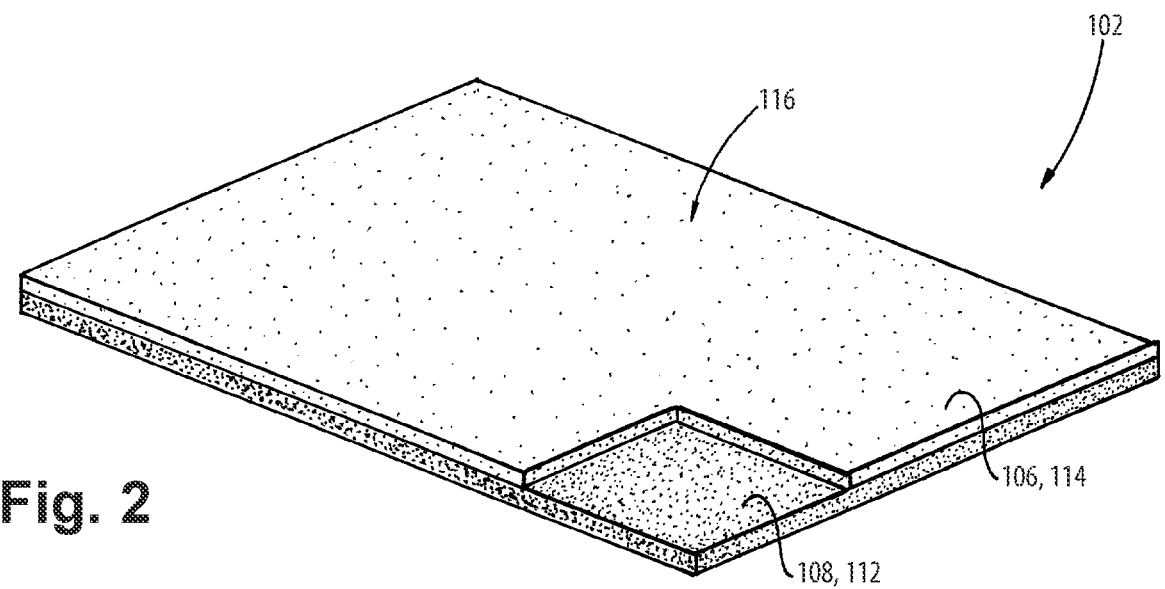
FIG. 2 is a schematic perspective view of an example of the coating of FIG. 1.
Figure 3:
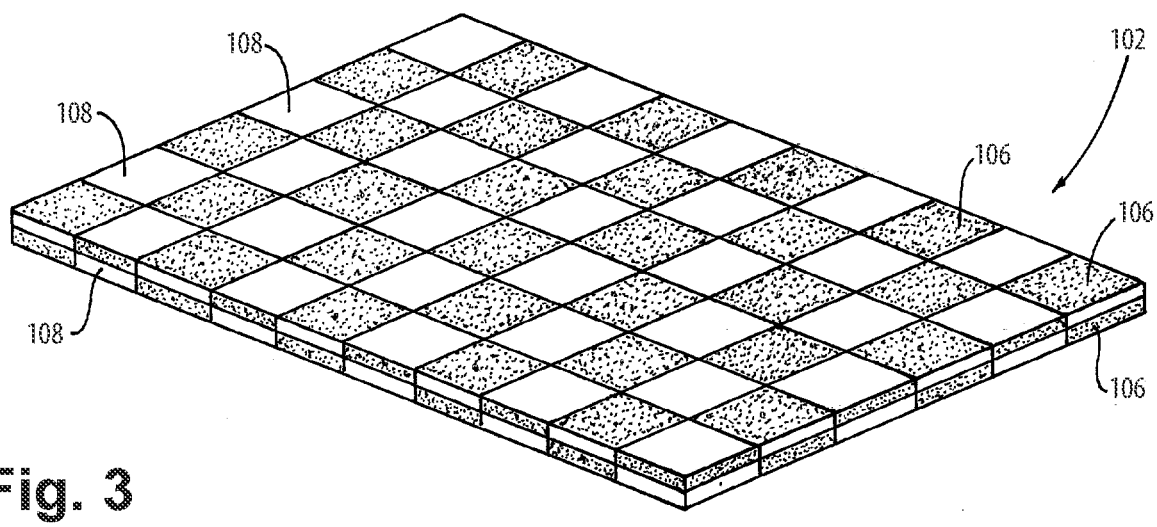
FIG. 3 is a schematic perspective view of another example of the coating of FIG. 1.
Figure 4:
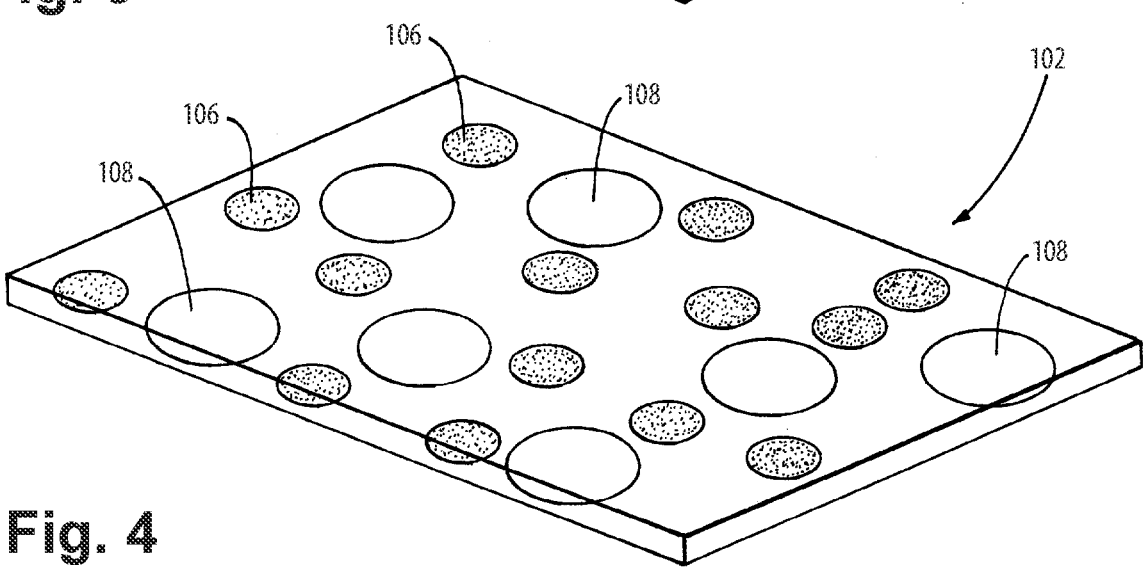
FIG. 4 is a schematic perspective view of yet another example of the coating of FIG. 1.

Referring now to FIGS. 2-4, the second material 108 can be in a first layer 112 and the first material 106 can be in a second layer 114 overlying the first layer 112. The second layer 114 an include a transparent matrix 116 for allowing visibility of color of the first layer 112 through the second layer 114. The first material 106 can be distributed as particles embedded in the transparent matrix 116.

The first material 106 and the second material 108 can both interspersed within a single layer as shown in FIGS. 3-4. For example, in embodiments, the first material 106 and the second material 108 can form a regular, repeating pattern in the single layer (e.g. checker, hexagons, and the like), as shown in FIG. 3. As shown in FIG. 4, the first material 106 and the second material 108 can form an irregular, non-repeating pattern in the single layer. In both cases, the scale of the pattern should be smaller than the size of the microbes desired to kill.

A method comprises receiving touch contact from a user (e.g. hand 110) on a surface 104 and disinfecting the surface 104 using a first material 106 after the user breaks contact with the surface 104. Once the surface 104 has been touched, a color of the surface 104 is changed using a second material 108 after the user breaks contact with the surface 104 from a first color 118 to a second color 120 as a visible indicator that the surface 104 has been recently touched. After a predetermined amount of time Δt, the color of the surface 104 is changed from the second color 120 back to the first color 118 after disinfecting the surface as an indicator that the surface is safe to touch (e.g. disinfecting is complete). Disinfecting the surface 104 and changing the color can include the surface self-cleaning and self-changing color.

The time Δt to disinfect the surface 104 can be 30 seconds or less, or any suitable time depending on the material chosen for the first material 106. Changing the color of the surface from the second color 120 back to the first color 118 after disinfecting can take 30 seconds or less, matching the time that is needed to disinfect the surface. However, it is contemplated that the time Δt to change the color from the second color 120 back to the first color 118 can be greater than the time Δt to disinfect the surface 104, ensuring that a user has waited a sufficient amount of time before touching the surface 104.

The methods and systems of the present disclosure, as described above and shown in the drawings, provide for increased confidence in user's ability to judge whether a surface is safe to touch and can limit the spread of easily transmissible microbes. While the apparatus and methods of the subject disclosure have been shown and described, those skilled in the art will readily appreciate that changes and/or modifications may be made thereto without departing from the scope of the subject disclosure.

What is claimed is:

1. A coating comprising:
   a first layer comprising a second material having at least one of tribochromatic, electrochromic, or halochromatic properties; and
   a second layer comprising a transparent matrix and directly overlaying the first layer, the second layer comprising distributed particles of a first material, the first material having at least one of anti-microbial or biostatic properties.

2. The coating as recited in claim 1, wherein the first material includes at least one of $CuO_2$ or a silver copper ion material.

3. The coating as recited in claim 1, wherein the transparent matrix allows visibility of color of the first layer through the second layer, wherein the first material is distributed as particles embedded in the transparent matrix.

4. The coating as recited in claim 1, wherein the first material and the second material are both interspersed within a single layer.

5. The coating as recited in claim 4, wherein the first material and the second material form a regular, repeating pattern in the single layer.

6. The coating as reciting in claim 4, wherein the first material and the second material form an irregular, non-repeating pattern in the single layer.

7. The coating as recited in claim 1, wherein, in response to a contact to the second layer, the first material disinfects the second layer in a first period of time, and wherein the second material changes from a first color to a second color in response to the contact and from the second color to the first color in a second period of time, the second period of time being greater than the first period of time.

8. An apparatus comprising:
- a substrate comprising at least one of a trolley handle, a door knob, a chair handle, a flush handle, a button, a platform in-front of a check-in desk, a security check basket, a boarding desk, and/or a toilet flush mechanism; and
- a coating on an external surface of the substrate, wherein the coating includes:
    - a first layer comprising a second material having at least one of tribochromatic, electrochromic, or halochromatic properties; and
    - a second layer comprising a transparent matrix and directly overlaying the first layer, the second layer comprising distributed particles of a first material, the first material having at least one of anti-microbial or biostatic properties.

9. The apparatus as recited in claim 8, wherein the first material includes at least one of $CuO_2$ or a silver copper ion material.

10. The apparatus as recited in claim 8, wherein the second material is in the second layer.

11. The apparatus as recited in claim 8, wherein the first material and the second material are both interspersed within a single layer.

12. The apparatus as recited in claim 8, wherein the transparent matrix allows visibility of color of the first layer through the second layer.

13. The apparatus as recited in claim 8, wherein, in response to a contact to the external surface of the substrate, the first material disinfects the external surface of the substrate in a first period of time, and wherein the second material changes from the first color to the second color in response to the contact and from a second color to a first color in a second period of time, the second period of time being greater than the first period of time.

* * * * *